United States Patent
Olomskiy

(10) Patent No.: US 8,500,553 B2
(45) Date of Patent: Aug. 6, 2013

(54) SYSTEM AND METHOD FOR PROVIDING A PROGRESS INDICATOR OF AN AMOUNT OF TIME LEFT IN A USERS TURN IN A VIRTUAL GAME ENVIRONMENT

(75) Inventor: Evgeny Olomskiy, Vladivostok (RU)

(73) Assignee: Kamagames Ltd., Limassol (CY)

( * ) Notice: Subject to any disclaimer, the term of this patent is extended or adjusted under 35 U.S.C. 154(b) by 88 days.

(21) Appl. No.: 13/225,100

(22) Filed: Sep. 2, 2011

(65) Prior Publication Data

US 2013/0059657 A1 Mar. 7, 2013

(51) Int. Cl.
*A63F 9/24* (2006.01)
(52) U.S. Cl.
USPC ............ 463/31; 463/6; 463/7; 463/9; 463/10; 463/16; 463/30; 463/32; 463/33; 463/40; 463/42
(58) Field of Classification Search
USPC ............... 463/1, 16–20, 36–37, 39–43, 6–10, 463/30–31
See application file for complete search history.

(56) References Cited

U.S. PATENT DOCUMENTS

| | | | |
|---|---|---|---|
| 2003/0228909 A1* | 12/2003 | Tanaka et al. | 463/42 |
| 2007/0078003 A1* | 4/2007 | Sato et al. | 463/43 |
| 2008/0090632 A1* | 4/2008 | Kumar | 463/16 |
| 2009/0239600 A1* | 9/2009 | Oomori | 463/6 |
| 2010/0029355 A1 | 2/2010 | O'Connor et al. | 463/11 |
| 2010/0035674 A1 | 2/2010 | Slomiany et al. | 463/9 |
| 2010/0197385 A1 | 8/2010 | Aoki et al. | 463/27 |
| 2010/0227691 A1 | 9/2010 | Karsten | 463/42 |
| 2010/0248843 A1 | 9/2010 | Karsten | 463/43 |
| 2011/0082571 A1 | 4/2011 | Murdock et al. | 700/92 |

* cited by examiner

*Primary Examiner* — Sunit Pandya
(74) *Attorney, Agent, or Firm* — Pillsbury Winthrop Shaw Pittman LLP

(57) ABSTRACT

A system and method provide a virtual game environment to users. The virtual game environment may enable the users to participate in a game within the virtual game environment. The game may be a turn-based game. A progress indicator may be included in views of the virtual game environment provided to the users that indicates an amount of time left in a present turn of a user in an enhanced manner. For example, the progress indicator may unobtrusively indicate an amount of time left in the present turn in a clear, distinctive manner.

20 Claims, 4 Drawing Sheets

SYSTEM AND METHOD FOR PROVIDING A PROGRESS INDICATOR OF AN AMOUNT OF TIME LEFT IN A USERS TURN IN A VIRTUAL GAME ENVIRONMENT

FIELD OF THE DISCLOSURE

This disclosure relates to a system and method for generating views of a virtual game environment that include a progress indicator that intuitively indicates an amount of time left in a current user turn, a user status and/or other information. The progress indicator may indicate an amount of time left in a current user turn through progression along a path associated with a user avatar from a beginning point to an ending point.

BACKGROUND

Virtual environments used to enable users to participate in games are known. Some of these games include turn-based games in which user turns have a timed length. Typically, views of these environments include a clock that counts down an amount of time left in a turn. While the clock may accurately convey the amount of time left in the turn, reading the clock may require users to take the time and concentration to actually read the clock. For example, the clock may appear in a location in the view that is spatially separate from other user interface features that are used and/or referred to by the user during his turn. This may be a distraction to the user whose turn it is, and/or may be inconvenient for other users.

SUMMARY

One aspect of the disclosure relates to a system and method for providing a virtual game environment to users. The virtual game environment may enable the users to participate in a game within the virtual game environment. The game may be a turn-based game. A progress indicator may be included in views of the virtual game environment provided to the users that indicates an amount of time left in a present turn of a user in an enhanced manner. For example, the progress indicator may unobtrusively indicate an amount of time left in the present turn in a clear, distinctive manner.

In some implementations, the system may include a server and client computing platforms that operate in a server/client configuration. Views of the virtual game environment may be presented to the users on the client computing platforms, and the users may be able to interact with the virtual game environment and/or participate in the game through inputs to the client computing platforms. The server may be configured to execute one or more of an environment module, a game module, a timing module, and/or other modules.

The environment module may be configured to determine view information for transmission to the client computing platforms. The view information may define views of the virtual game environment. The view information may facilitate presentation of views of the virtual game environment to the users on the client computing platforms. The virtual game environment may be common among the users. In the views of the virtual game environment, the individual users may be represented by avatars. The users may comprise a first user represented by a first avatar.

The game module may be configured to manage a game being played by the users within the game environment. The game may be a turn-based game. The turns of the users during the game may be timed. Managing the game may include one or more of determining score, assessing success and/or failure (e.g., of individual actions, sets, of actions, matches, game events within an individual match, and/or other episodes), determining random or pseudo-random game parameters (e.g., card value during ordering and/or distribution, dice values, battle multipliers, and/or other parameters), and/or other game management functions.

The timing module may be configured to determine transitions of user turns. These transitions may include turn beginnings, turn endings, and/or other transitions. The transitions may be determined such that individual turns have a turn length. The turn length may be a fixed length for all user turns, may be first length that can be extended by the timing module, may be variable, and/or other may have other lengths. The turns may be adjacent to each other in time, such that responsive to the turn of a given user ending, the turn of the next user may begin. The turns may be separated by some time buffer in time.

The environment module may further be configured such that views of the game environment depict a progress indicator that progresses along paths associated with individual avatars during the turns of the corresponding users. The progress indicator may be configured such that during a turn of the first user, the progress indicator progresses along a path in the views of the game environment from a starting point that corresponds to the beginning of the turn of the first user to an ending point that corresponds to the end of the turn of the first user. The progress of the progress indicator from the starting point to the ending point may graphically indicate an amount of time left in the turn of the first user. The speed of the progress indicator may be constant throughout the turn. The speed of the progress indicator may accelerate and/or decelerate during the first user's turn. Acceleration and/or deceleration may take place at specific points in time during the turn, responsive to user performance (e.g., positive or negative performance), and/or for other reasons.

In some implementations, the speed of the progress indicator may be constant during the turn, but may be adjusted on a per turn basis to ensure that the user's turn is for the same amount of time. For example, if the view presented to the first user does not indicate it is the first user's turn until after some delay (e.g., due to network latency and/or other phenomena), the speed for the progress indicator may be determined as the speed at which the progress indicator must travel to travel the distance from the starting point to the ending point during the time remaining in the first user's turn (after the delay).

During the turn of a given user, the path may be around the avatar of the given user. This may include bending to surround the first avatar on at least two sides, on at least three sides, on at least four sides, and/or in other configurations (e.g., depending on the shape of the first avatar). The path may be a circle, an oval, a polygon, and/or other shapes. The path may proceed along one side of the avatar in a shape that bends (e.g., wavy), crosses over itself, and/or may have other features along the one side of the avatar.

In some implementations, as the progress indicator progresses from the starting point to the ending point of the path in the views of the game environment, the progress indicator may increase or decrease in length. The increase or decrease in length experienced by the progress indicator in the views of the game environment may be equal to the distance the progress indicator has moved along the path. This may appears as if the progress indicator is "growing" toward the ending point, or "shrinking" down to the ending point.

As the progress indicator progresses from the starting point to the ending point, the progress indicator may change colors in the views of the game environment. For example, at the beginning of the turn of the first user the progress indicator may have a first color and at the end of the turn of the first user the progress indicator may have a second color. Between the starting point and the ending point, the progress indicator may have one or more additional colors (e.g., a third color). By way of non-limiting example, the color of the progress indicator may change from green, to yellow, to red. The changing of color by the progress indicator may be provided a further visual indicator of the time left in the turn.

As the progress indicator progresses from the starting point to the ending point, the progress indicator may have one or more other visual characteristics that change in views of the game environment to indicate the progression of time during the turn. For example, the contrast and/or brightness may be adjusted as a function of time (e.g., brighter and/or more contrast toward the end of the turn), a height of the progress indicator out of the plane of the display (e.g., represented isometrically, in perspective, and/or with 3D technology) may be adjusted as a function of time (e.g., taller or shorter toward the end of the turn), a thickness of the progress indicator (e.g., wider or narrower toward the end of the turn), and/or other visual characteristics may be adjusted over time during the turn.

As the progress line proceeds along the path, one or more other sensory cues about the amount of time left in the turn may be provided to the user(s). These cues may include, for example, audible cues, tactile cues (e.g., through vibration and/or tactical feedback), and/or other sensory cues.

It will be appreciated that the description of the progress indicator proceeding along a single path is not intended to be limiting. In some implementations, the progress indicator may move along a plurality of spatially separate paths during the turn of a user. This may include implementations in which a single progress indicator moves along the different paths in succession, implementations in which a plurality of progress indicators that move along the separate paths simultaneously (at least for a portion of the turn), and/or other implementations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
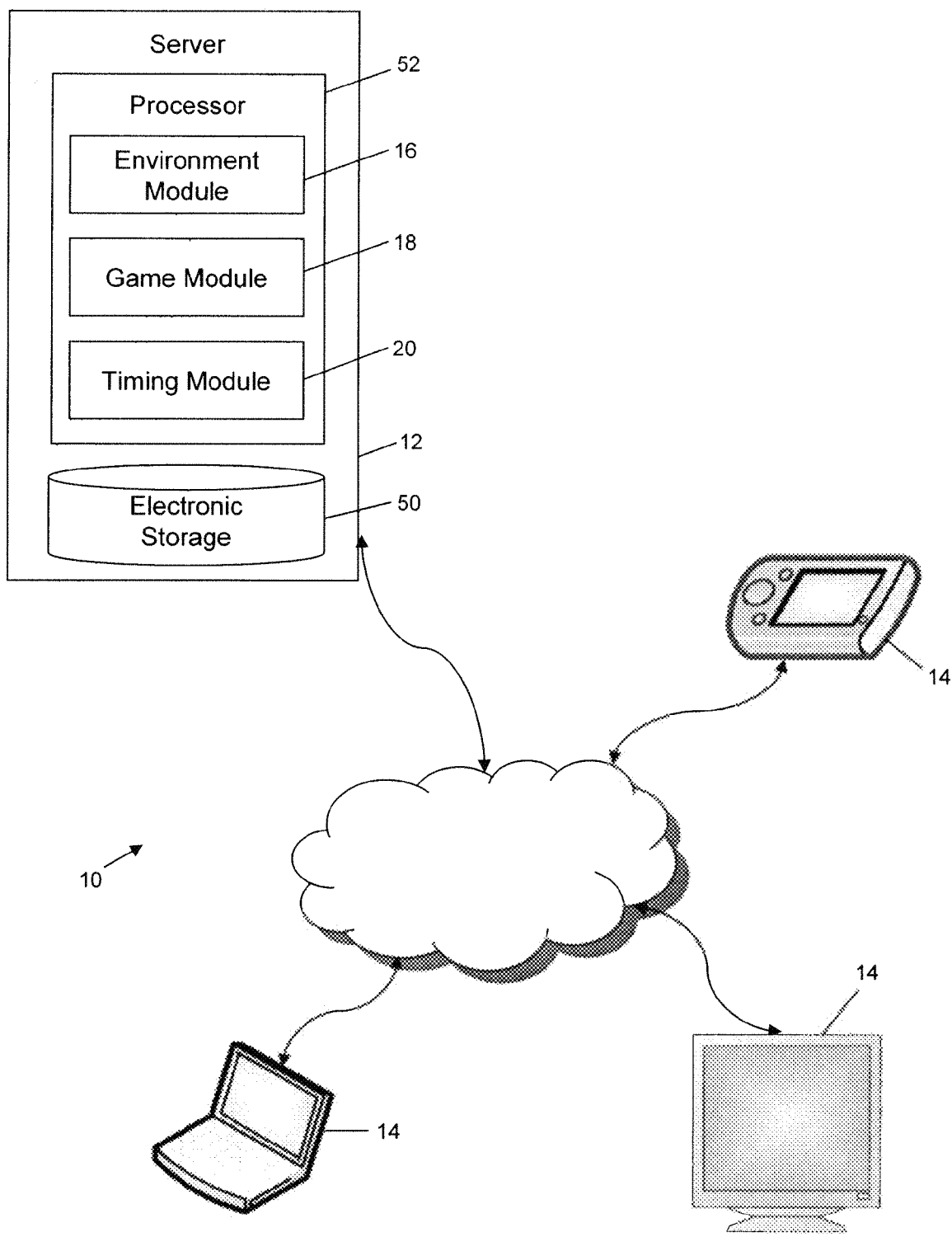
FIG. 1 illustrates a system configured to provide a virtual game environment to users.

FIG. 1 illustrates a system 10 configured to provide a virtual game environment to users. The system 10 may be configured such that the users participate in a game within the virtual game environment that is a turn-based game. An enhanced visual indicator of turn length may be provided to users in views of the virtual game environment. Providing the virtual game environment may include hosting the virtual game environment over a network.

In some implementations, system 10 may include a server 12. The server 12 may be configured to communicate with one or more client computing platforms 14 according to a client/server architecture. The users may access system 10 and/or the virtual game environment via client computing platforms 14.

The server 12 may be configured to execute one or more computer program modules. The computer program modules may include one or more of an environment module 16, a game module 18, a timing module 20, and/or other modules.

The environment module 16 may be configured to provide one or more virtual game environments to users via client computing platforms 14. As used herein, a "virtual environment" may include a virtual space, one or more interactive, electronic social media, and/or other virtual environments. A virtual game environment may refer to a virtual environment in which a game is being played that involves a plurality of users. Providing a virtual environment to users may include executing one or more instances of a virtual environment, determining view information representing the virtual environment (e.g., from the instance(s)) for the users (e.g., individually and/or collectively), transmitting the view information to the client computing platforms 14 associated with the users to facilitate views of the virtual environment being presented to the users, and/or other activities.

A virtual space may comprise a simulated space that is accessible by users via clients (e.g., client computing platforms 14) that present the views of the virtual space to a user. The simulated space may have a simulated physical layout, express ongoing real-time interaction by one or more users, and/or be constrained by simulated physics that governs interactions between virtual objects in the simulated space. In some instances, the simulated physical layout may be a 2-dimensional layout. In other instances, the simulated physical layout may be a 3-dimensional layout.

The above description of virtual spaces is not intended to be limiting. The environment module 16 may be configured to express the virtual space in a more limited, or more rich, manner. For example, views of the virtual space presented to the users may be selected from a limited set of graphics depicting an event in a given place within the virtual space. The views may include additional content (e.g., text, audio, pre-stored video content, movable icons, avatars, and/or other content) that describes particulars of the current state of the space, beyond the relatively generic graphics. For example, a view of the virtual space may depict a card table and/or a non-player character that are static (or change relatively little) visually in views of virtual space. Icons representing game components (e.g., game pieces, playing cards, dice, and/or other game components) may change and/or move within the views of the virtual space to depict a game being played within the virtual space. Other expressions of individual places within the virtual space are contemplated.

Within the instance(s) of the virtual space (or other virtual environment) executed by environment module 16, users may control avatars to interact with the virtual space and/or each other. As used herein, the term "user character" may refer to an object (or group of objects) present in the virtual space that represents an individual user. The avatar may be controlled by the user with which it is associated. The avatars may move through and interact with the virtual space (e.g., non-user characters in the virtual space, other objects in the virtual space), or the avatars may be relatively static visually within views of virtual space. The avatar representing a given user may be created and/or customized by the given user. The user may have an "inventory" of virtual goods and/or currency that the user can use (e.g., by manipulation of an avatar or other user controlled element, and/or other items), display, gift, and/or otherwise interact with in the virtual space.

The users may participate in the virtual space by controlling one or more of the available user controlled elements in the virtual space (e.g., game elements, avatars, and/or other elements). Control may be exercised through control inputs and/or commands input by the users through client computing platforms 14.

Interactive, electronic social media may include one or more of a social network, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. As was the case with virtual spaces, in some implementations, users may be represented within interactive, electronic social media by avatars. An avatar representing a given user may be presented in views of the interactive, electronic social media as being associated with content that may be provided by the given user, directed the given user, related to the given user, and/or associated with the given user in other ways. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

The game module 18 may be configured to manage the game being played by the users within the virtual game environment. Managing the game may include one or more of determining score, assessing success and/or failure (e.g., of individual actions, sets, of actions, matches, game events within an individual match, and/or other episodes), determining random or pseudo-random game parameters (e.g., card value during ordering and/or distribution, dice values, battle multipliers, and/or other parameters), and/or other game management functions. Managing the game may include accepting input in the form of user selections and/or actions (e.g., input at client computing platforms 14), output from one or more random (or pseudo-random) number generators, rules and/or settings governing one or more game mechanics of the game, and/or other inputs. Managing the game may include determining outputs in the form scores (e.g., of individual actions, sets, of actions, matches, game events within an individual match, and/or other episodes), winners and/or losers, required actions to be performed by the users, and/or other outputs.

By way of non-limiting example, in some implementations, game module 18 may be configured to manage a game of poker being played within the virtual game environment. Such management may require one or more of determining blind size and/or assignment, determining card value and/or distribution, managing the pot (e.g., receiving bets, distributing winnings, and/or other management), determining hand winners, maintaining user chip stacks, maintaining user bank rolls, and/or other management tasks. As another non-limiting example, game module 18 may be configured to manage a game of backgammon. Such management may require one or more of managing checker position, determining dice value, determining doubling cube value, determining score, determining a winner, and/or other management tasks. Implementations in which game module 18 manages other turn-based games are contemplated. Such games may be based on real world board and/or card games, and/or games that have not previously been implemented as real world games.

It will be appreciated that the description herein of environment module 16 providing a virtual game environment to a set of users in which a game is being played by the set of users is not intended to be limiting. For example, environment module 16 may be configured to provide a plurality of different virtual game environments to a plurality of different sets of users. The individual sets of users may be participating in different instances of the game within the individual virtual game environments. The concepts described herein with respect to the individual virtual game environment and game should be extendible to implementations in which a plurality of different virtual game environments are being used to conduct a plurality of different instances of the game (e.g., between different sets of users).

The timing module 20 may be configured to determine transitions of user turns. These transitions may include turn beginnings, turn endings, and/or other transitions. The transitions may be determined such that individual turns have a turn length. The turn length may be a fixed length for all user turns, may be first length that can be extended by timing module 20, may be variable, and/or other may have other lengths. The turns may be adjacent to each other in time, such that responsive to the turn of a given user ending, the turn of the next user may begin. The turns may be separated by some time buffer in time. This may delay the beginning of a next turn after the previous turn by the time buffer. The time buffer may be have a fixed length and/or may have a variable length. The length of the time buffer may vary, for example, based on lag between client computing platforms 14 and server 12, a strength of a network connection between one or more of client computing platforms 14 and server 12, and/or other parameters.

In some implementations, at a turn beginning, server 12 may be configured to transmit communication to the client computing platform 14 corresponding to the user whose turn is beginning. The communication may signal to the client computing platform 14 that the user's turn is beginning/has begun. The communication may include an update to the virtual game environment that indicates one or more results from a previous turn. The timing module 20 may be configured to listen for a response from the client computing platform 14 to this communication. Responsive to not receiving a response from the client computing platform 14, timing module 20 may extend the turn length. This may include adding a predetermined amount of time to the turn length, extending the term length by a dynamically determined amount of time, and/or other extending the turn length in other ways. The extension of the turn length may be indicated within the virtual game environment (e.g., as described below).

The environment module 16 may further be configured such that the views of virtual game environment may depict a progress indicator. The progress indicator may indicate an amount of time left in a current turn of one of the users. The progress indicator may progress around individual avatars during the turns of the corresponding users such that during a turn of a given user, the progress indicator may progress around the avatar of the given user from a starting point to an ending point. The starting point and the ending point may be the same point (e.g., the progress indicator makes a complete lap around the avatar). The starting point may correspond to the beginning the given user's turn. The ending point may correspond to the end of the given user's turn.

Figure 2:
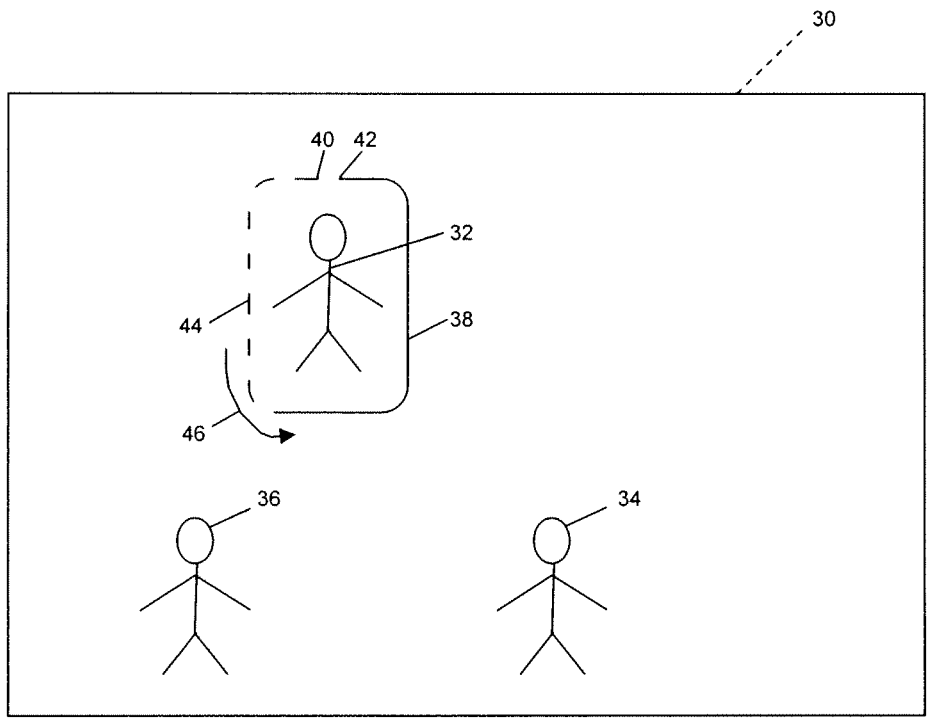
FIG. 2 illustrates a view of a virtual game environment.

By way of illustration, FIG. 2 illustrates a view 30 of a virtual game environment. View 30 may be presented to a first user via a client computing platform similar to or the same as client computing platform 14 (shown in FIG. 1 and described herein). The view 30 may be generated by the client computing platform based on view information received by the client computing platform from a server similar to or the same as server 12 (shown in FIG. 1 and described herein). Within the virtual game environment, a set of users may be participating in a game with the first user.

The view 30 may depict a set of avatars including a first avatar 32, a second avatar 34, a third avatar 36, and/or other avatars. The avatars 32, 34, and/or 36 may correspond to the users participating in the game. For example, first avatar 32 may correspond to the first user, second avatar 34 may correspond to a second user, and/or third avatar 36 may correspond to a third user.

Within view 30, responsive to it being the first user's turn in the game, a progress indicator 38 may indicate an amount of time left in the first user's turn. Responsive to it being the second user's turn or the third user's turn, progress indicator 38 may indicate an amount of time left in these turns. During the turn of the first user, progress indicator 38 may progress around first avatar 32 from a starting point 40 to an ending point 42. The starting point 40 may correspond to the beginning of the first user's turn such that at the beginning of the first user's turn progress indicator 38 may be located at starting point 40. The ending point 42 may correspond to the end of the first user's turn such that at the end of a period of time for the first user's turn progress indicator 38 may be located at ending point 42. The speed of progress indicator 38 during the first user's turn may be constant. The speed of progress indicator 38 may accelerate and/or decelerate during the first user's turn. Acceleration and/or deceleration may take place at specific points in time during the turn, responsive to user performance (e.g., positive or negative performance), and/or for other reasons.

In some implementations, the speed of progress indicator 38 may be constant during the turn, but may be adjusted on a per turn basis to ensure that the user's turn is for the same amount of time. For example, if the view presented to the first user does not indicate it is the first user's turn until after some delay (e.g., due to network latency and/or other phenomena), the speed for progress indicator 38 may be determined as the speed at which progress indicator 38 must travel to travel the distance from starting point 40 to ending point 42 during the time remaining in the first user's turn (after the delay).

In progressing around first avatar 32, progress indicator 38 may follow a path 44 that bends to at least partially surround first avatar 32 on at least two sides, on at least three sides, or on at least four sides. This may include surrounding first avatar 32 without surrounding any other avatar in view 30, and/or may include surrounding first avatar 32 without surrounding any other object in view 30. The path 44 may be translucent (e.g., not visible in view 30), may have a color different than that of progress indicator 38, and/or may be depicted in other ways. The progress indicator 38 may proceed along the path in the direction indicated by arrow 46 (and/or the opposite direction, or any other trajectory). As was mentioned above, starting point 40 and ending point 42 may be the same point or different points. In implementation in which starting point 40 and ending point 42 are different points, path 44 may be open or closed (e.g., with part of path 44 overlapping). The path 44 may be circular, oval, polygonal, and/or have other shapes. In implementations in which path 44 forms a shape having corners (e.g., as shown in FIG. 2), the corners may be chamfered.

If progress indicator 38 progresses during the first user's turn from starting point 40 to ending point 42, this may indicate that the first user did not take timely enough action. This may result in the first user losing his turn, being removed from the game, being removed from the virtual game environment, and/or have other consequences. In some games, the user may be attempting to perform some action for the duration of his turn. Iterations of the action may have additional value to the first user in the game, so that the first user may continue to perform the action (or actions) until progress indicator 38 reaches ending point 42, indicating that the first user's turn is over and that the first user will not be able to iterate the action (or actions) any more during this turn.

As progress indicator 38 progresses along path 44, progress indicator 38 may change size. This may include increasing in length, decreasing in length, and/or changing size in other ways. For example, as progress indicator 38 progresses along path 44, progress indicator 38 may decrease in length by a distance equal to the distance along path 44 that progress indicator 38 has travelled. This is illustrated in FIG. 2, which shows the progress of progress indicator 38 being depicted by a decrease in length that correspond to the distance along path 44 that progress indicator 38 has travelled. As another example, as progress indicator 38 progresses along path 44, progress indicator 38 may increase in length by a distance equal to the distance along path 44 that progress indicator 38 has travelled. This may result in progress indicator 38 "growing" during its progress until it runs along the entirety of path 44.

During the turns of the users, the progress indicator 38 may change colors. The change in color may be correlated to an amount of time left in a present turn. For example, at the beginning of the first user's turn (e.g., when progress indicator 38 is at or near starting point 40), progress indicator 38 may have a first color. At the end of the first user's turn (e.g., when progress indicator 38 is at or near ending point 42), progress indicator 38 may have a second color. At a point along path 44 between starting point 40 and ending point 42 (e.g., at a time between the beginning and end of the turn), progress indicator 38 may have third color. By way of non-limiting example, the first color may be green, the second color may be red, and the third color may be yellow. Other color combinations and/or numbers of colors (e.g., 2, 4, 5, 6, etc.) are contemplated within the scope of this disclosure.

As progress indicator 38 progresses from starting point 40 to ending point 42, the progress indicator may have one or more other visual characteristics that change in views of the game environment to indicate the progression of time during the turn. For example, the contrast and/or brightness may be adjusted as a function of time (e.g., brighter and/or more contrast toward the end of the turn), a height of progress indicator 38 out of the plane of the display (e.g., represented isometrically, in perspective, and/or with 3D technology) may be adjusted as a function of time (e.g., taller or shorter toward the end of the turn), a thickness of progress indicator 38 (e.g., wider or narrower toward the end of the turn), and/or other visual characteristics may be adjusted over time during the turn.

As progress indicator 38 proceeds along the path, one or more other sensory cues about the amount of time left in the turn may be provided to the user(s). These cues may include, for example, audible cues, tactile cues (e.g., through vibration and/or tactical feedback), and/or other sensory cues.

It will be appreciated that the description of progress indicator 38 proceeding along a single path 44 is not intended to be limiting. In some implementations, progress indicator 38 may move along a plurality of spatially separate paths during the turn of a user. This may include implementations in which a single progress indicator moves along the different paths in succession, implementations in which a plurality of progress indicators that move along the separate paths simultaneously (at least for a portion of the turn), and/or other implementations.

At the end of the first user's turn (e.g., because the first user's makes his move and/or because his time runs out), it may become the second user's turn. During the second user's turn, progress indicator 38 may begin to follow path 44 around second avatar 34 to indicate an amount of time left in the second user's turn, as shown for illustrative purposes in FIG. 3. Similarly, after the end of second user's turn, it may become the third user's turn and progress indicator 38 may begin to progress around third avatar 36 to indicate an amount of time left in the third user's turn (not shown).

During the game, the users may receive views of the virtual game environment that are the same or different. However, some or all of the features represented in view 30 of FIGS. 2 and 3 (e.g., elements 32, 34, 36, 38 and/or other features) may be present in the views provided to each of the individual users participating in the game (e.g., the first user, the second user, the third user, and/or other users).

Figure 4:
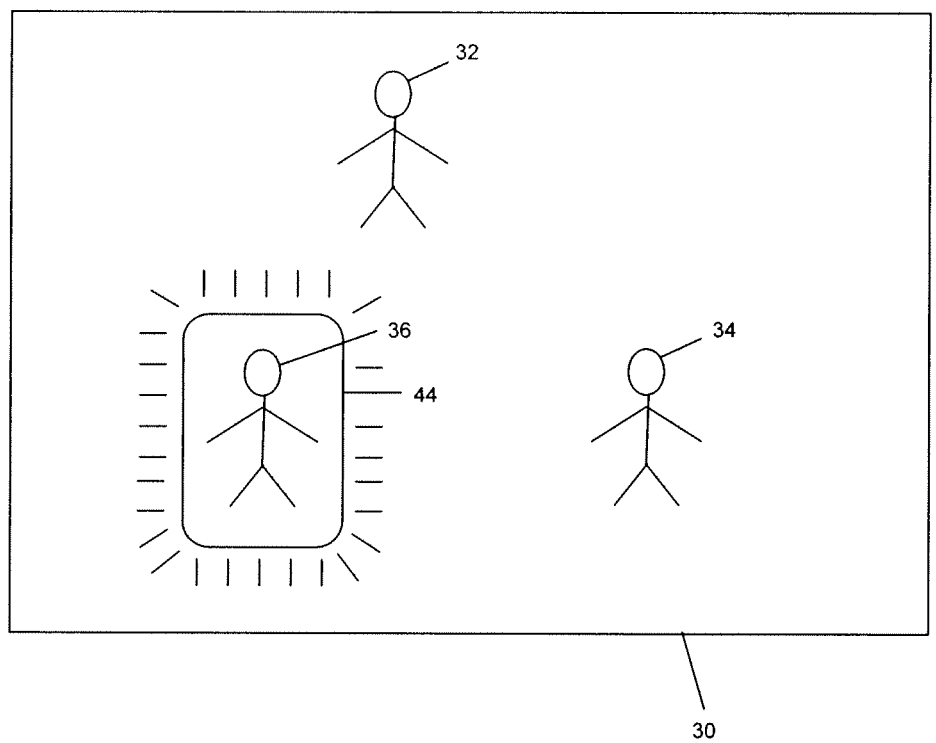
FIG. 4 illustrates a view of a virtual game environment.

In FIG. 4, view 30 of the virtual game environment is shown at the end of a game. At the end of the game, path 44 may be implemented to visually indicate success within the game (e.g., a winner of the game and/or other success). By way of non-limiting example, FIG. 4 may depict implementation of path 44 to indicate that the third user may have had some success in the game (e.g., has won the game and/or has had some other success). The indication may be provided in the form of a color change, a flashing of path 44, a change in a size of path 44, and/or through other visual mechanisms.

Figure 3:
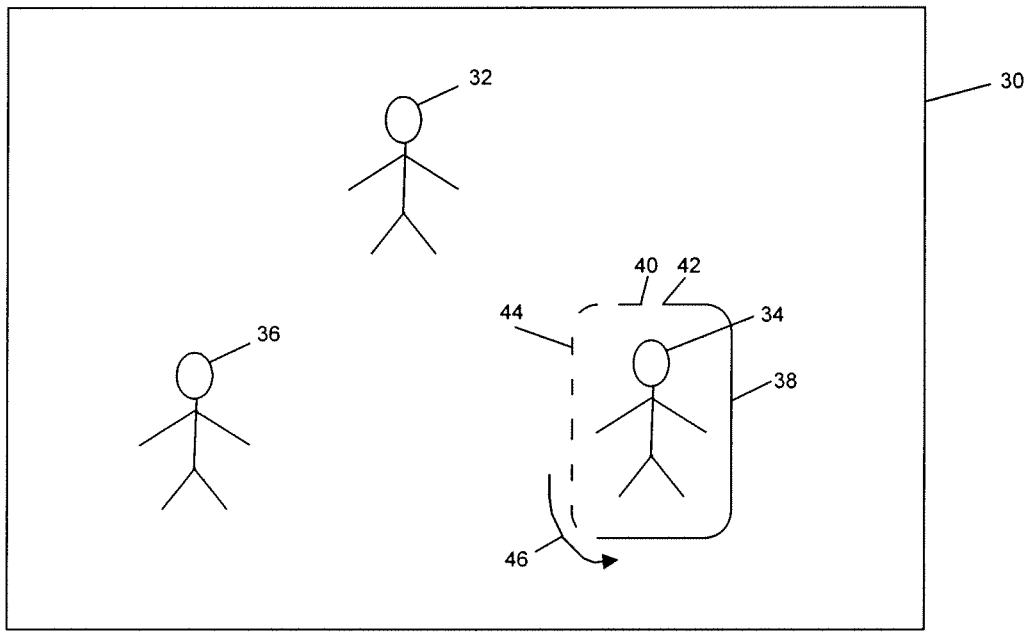
FIG. 3 illustrates a view of a virtual game environment.

In the examples of view 30 illustrated in FIGS. 2-4, avatars 32, 34, and/or 36 may be located at fixed positions within the views. It will be appreciated that this is not intended to be limiting. In some implementations one or more of avatars 32, 34, and/or 36 may be mobile within view 30. In such implementations, progress indicator 38 may move through view 30 with the avatar for which it is providing an indication.

Turning back to FIG. 1, in some implementations, 12 server and client computing platforms may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12 and/or client computing platforms 14.

A given client computing platform 14 may include one or more processors, and electronic display, a control interface, and/or other components. The one or more processors may be configured to execute computer program modules. The computer program modules may be configured to enable or user associated with the given client computing platform 14 to interface with system 10, and/or provide other functionality attributed herein to client computing platforms 14. For example, the computer program modules may include a view module configured to receive view information from server 12 (e.g., generated by environment module 16), and to present a view of the virtual game environment (e.g., as described above) based on the received view information. This may facilitate participation by the user of the given client computing platform 14 in the game taking place in the virtual game environment. By way of non-limiting example, the given client computing platform 14 may include one or more of a desktop computer, a laptop computer, a handheld computer, a tablet computing platform, a NetBook, a Smartphone, a gaming console, and/or other computing platforms.

The server 12 may include electronic storage 50, one or more processors 52, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented "in the cloud" by a plurality of computing platforms operating together as server 12.

Electronic storage 50 may comprise electronic storage media that electronically stores information. The electronic storage media of electronic storage 50 may include one or both of system storage that is provided integrally (i.e., substantially non-removable) with server 50 and/or removable storage that is removably connectable to server 50 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 50 may include one or more virtual storage resources (e.g., cloud storage, a virtual private network, and/or other virtual storage resources). Electronic storage 50 may store software algorithms, information determined by processor 52, information received from server 12, information received from client computing platforms 14, and/or other information that enables server 12 to function as described herein.

Processor(s) 52 is configured to provide information processing capabilities in server 12. As such, processor 52 may include one or more of a digital processor, an analog processor, a digital circuit designed to process information, an analog circuit designed to process information, a state machine, and/or other mechanisms for electronically processing information. Although processor 52 is shown in FIG. 1 as a single entity, this is for illustrative purposes only. In some implementations, processor 52 may include a plurality of processing units. These processing units may be physically located within the same device, or processor 52 may represent processing functionality of a plurality of devices operating in coordination. The processor 52 may be configured to execute modules 16, 18, and/or 20. Processor 52 may be configured to execute modules 16, 18, and/or 20 by software; hardware; firmware; some combination of software, hardware, and/or firmware; and/or other mechanisms for configuring processing capabilities on processor 52.

It should be appreciated that although modules 16, 18, and/or 20 are illustrated in FIG. 1 as being co-located within a single processing unit, in implementations in which processor 52 includes multiple processing units, one or more of modules 16, 18, and/or 20 may be located remotely from the other modules. As a non-limiting example, some or all of the functionality attributed to modules 16, 18, 20, and/or 22 may be provided "in the cloud" by a plurality of processors connected through a network. The description of the functionality provided by the different modules 16, 18, and/or 20 herein is for illustrative purposes, and is not intended to be limiting, as any of modules 16, 18, and/or 20 may provide more or less functionality than is described. For example, one or more of modules 16, 18, and/or 20 may be eliminated, and some or all of its functionality may be provided by other ones of modules 16, 18, and/or 20. As another example, processor 52 may be configured to execute one or more additional modules that may perform some or all of the functionality attributed below to one of modules 16, 18, and/or 20.

Figure 5:
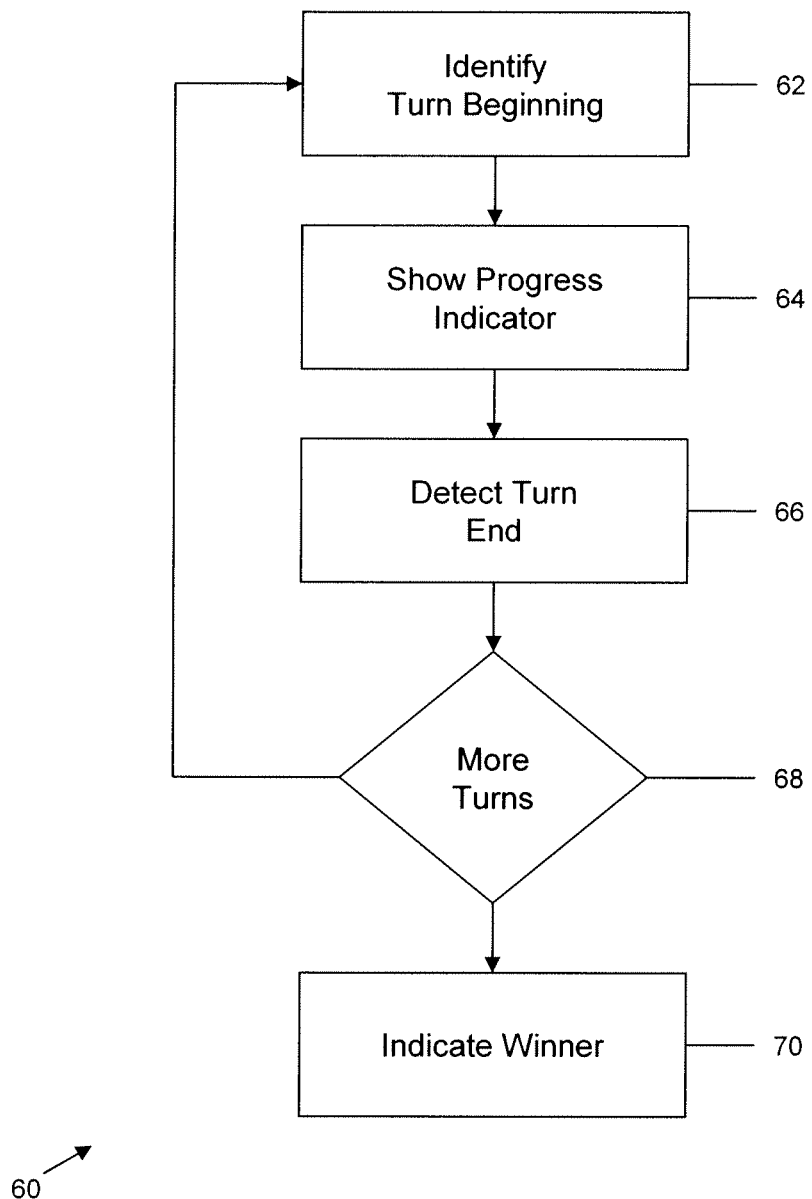
FIG. 5 illustrates a method of providing a virtual game environment to users.

FIG. 5 illustrates a method 60 of providing a virtual game environment to client computing devices for interaction by users. The operations of method 60 presented below are intended to be illustrative. In some embodiments, method 60 may be accomplished with one or more additional operations not described, and/or without one or more of the operations discussed. Additionally, the order in which the operations of method 60 are illustrated in FIG. 5 and described below is not intended to be limiting.

In some embodiments, method 60 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 60 in response to instructions stored electronically on an electronic storage medium. The one or more processing devices may include one or more devices configured through hardware, firmware, and/or software to be specifically designed for execution of one or more of the operations of method 60.

At an operation 62, a beginning of a turn in a game being played in the virtual game environment may be identified. The turn may be the turn of one of the users participating in the game. In some implementations, operation 62 may be performed by a timing module similar to or the same as timing module 20 (shown in FIG. 1 and described herein).

At an operation 64, views of the virtual game environment may be provided to the users that include a progress indicator that indicates an amount of time left in the turn of the user. The progress indicator may be similar to or the same as progress indicator 38 (shown in FIGS. 2 and 3, and described herein). Providing the views to the users may include generating view information that facilitates presentation of the views, generating the views based on view information describing the views, and/or other functions. In some implementations, operation 64 may be performed by an environment module executed by a server similar to or the same as environment module 16 (shown in FIG. 1 and described herein), and/or a view module executed by a client computing platform (e.g., as described herein).

At an operation 66, an end of the turn may be detected. The turn may be ended based on the passage of time, based on a user taking an action that ends the turn, and/or based on other events. In some implementations, operation 66 may be performed by a timing module similar to or the same as timing module 20 (shown in FIG. 1 and described herein).

At an operation 68, a determination may be made as to whether another turn should begin. Responsive to a determination that another turn should begin, method 60 may return to operation 62. Responsive to a determination another turn should not begin, method 60 may proceed to an operation 70.

At operation 70, a winner of the game may be determined, and the winner may be indicated one or more of the view of the virtual game environment by adjusting a visual appearance of a path followed by the progress indicator. This may include, for example, adjusting the visual appearance of the path followed by the progress indicator around an avatar of a user that has won the game and/or had some other success in the game. The adjustment in the visual appearance may include a change in color, size, a flashing, and/or other adjustments. In some implementations, operation 70 may be performed by an environment module executed by a server similar to or the same as environment module 16 (shown in FIG. 1 and described herein), and/or a view module executed by a client computing platform (e.g., as described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a virtual game environment to users, the system comprising:
one or more processors configured to execute computer program modules comprising:
an environment module configured to determine view information for transmissions to client computing platforms associated with users that facilitate presentation of views of a game environment to the users on the client computing platforms, wherein the game environment is common among the users, wherein the individual users are represented in the game environment by avatars, and wherein the users comprise a first user represented by a first avatar;
a game module configured to manage a game being played by the users within the game environment, wherein the game is a turn-based game, and wherein user turns during the game are timed; and
a timing module configured to determine transitions of user turns including turn beginnings and turn endings, and
wherein the environment module is further configured such that views of the game environment depict a progress indicator that progresses around individual avatars during the turns of the corresponding users such that during a turn of the first user the progress indicator progresses around the first avatar in the views of the game environment from a starting point that corresponds to the beginning of the turn of the first user to an ending point that corresponds to the end of the turn of the first user, whereby the progress of the progress indicator from the starting point to the ending point graphically indicates an amount of time left in the turn of the first user.

2. The system of claim 1, wherein the game environment module is configured such that during the turn of the first user the progress indicator follows a path from the starting point to the ending point that surrounds the first avatar in the views of the game environment.

3. The system of claim 2, wherein the game environment module is configured such that during the turn of the first user as the progress indicator progresses from the starting point to the ending point of the path in the views of the game environment the progress indicator increases in length.

4. The system of claim 3, wherein the game environment module is configured such that during the turn of the first user as the progress indicator progresses from the starting point to the ending point of the path, the increase in the length of the progress indicator in the views of the game environment is equal to the distance the progress indicator has moved along the path.

5. The system of claim 2, wherein the game environment module is configured such that during the turn of the first user as the progress indicator progresses from the starting point to the ending point of the path in the views of the game environment the progress indicator decreases in length.

6. The system of claim 5, wherein the game environment module is configured such that during the turn of the first user as the progress indicator progresses from the starting point to the ending point of the path, the decrease in the length of the progress indicator in the views of the game environment is equal to the distance the progress indicator has moved along the path.

7. The system of claim 2, wherein the game environment module is configured such that during the turn of the first user the one or more portions of the path that are not occupied by the progress indicator are depicted in the views of the game environment as having a different color than the progress indicator.

8. The system of claim 1, wherein the game environment module is configured such that during the turn of the first user the progress indicator changes colors in the views of the game environment such that at the beginning of the turn of the first user the progress indicator has a first color and at the end of the turn of the first user the progress indicator has a second color.

9. The system of claim 1, wherein the game environment module is configured such that during the turn of the first user the progress indicator has a third color in the views of the game environment at a point in time between the beginning of the turn and the end of the turn.

10. The system of claim 1, wherein the game environment module is configured such that responsive to a success of the first user in the game, the path changes color in the views of the game environment to indicate the success of the first user.

11. A client computing platform configured to present a view of a virtual game environment to a first user, the client computing platform comprising:
an electronic display;
a control interface;
one or more processors configured to execute computer program modules comprising:
a view module configured to receive view information from a server, and generate a view of a game environment for presentation to a user via the electronic display,
wherein the game environment is common among the user and a set of other users to facilitate playing of a group game by the user and the set of other users within the game environment,
wherein the individual users are represented in view of the game environment by avatars,
wherein the set of other users comprise a first user represented by a first avatar,
wherein the game is a turn-based game,
wherein user turns during the game are timed; and
wherein the view module is further configured such that the view of the game environment depicts a progress indicator that progresses around individual avatars during the turns of the corresponding users such that during a turn of the first user the progress indicator progresses around the first avatar in the view of the game environment from a starting point that corresponds to the beginning of the turn of the first user to an ending point that corresponds to the end of the turn of the first user, whereby the progress of the progress indicator from the starting point to the ending point graphically indicates an amount of time left in the turn of the first user.

12. The client computing platform of claim 11, wherein the view is configured such that during the turn of the first user the progress indicator follows a path from the starting point to the ending point that surrounds the first avatar in the view of the game environment.

13. The client computing platform of claim 12, wherein the view module is configured such that during the turn of the first user as the progress indicator progresses from the starting point to the ending point of the path in the view of the game environment the progress indicator increases in length.

14. The client computing platform of claim 13, wherein the view module is configured such that during the turn of the first user as the progress indicator progresses from the starting point to the ending point of the path, the increase in the length of the progress indicator in the view of the game environment is equal to the distance the progress indicator has moved along the path.

15. The client computing platform of claim 12, wherein the view module is configured such that during the turn of the first user as the progress indicator progresses from the starting point to the ending point of the path in the view of the game environment the progress indicator decreases in length.

16. The client computing platform of claim 15, wherein the view module is configured such that during the turn of the first user as the progress indicator progresses from the starting point to the ending point of the path, the decrease in the length of the progress indicator in the view of the game environment is equal to the distance the progress indicator has moved along the path.

17. The client computing platform of claim 12, wherein the view module is configured such that during the turn of the first user the one or more portions of the path that are not occupied by the progress indicator are depicted in the view of the game environment as having a different color than the progress indicator.

18. The client computing platform of claim 11, wherein the view module is configured such that during the turn of the first user the progress indicator changes colors in the view of the game environment such that at the beginning of the turn of the first user the progress indicator has a first color and at the end of the turn of the first user the progress indicator has a second color.

19. The client computing platform of claim 11, wherein the view module is configured such that during the turn of the first user the progress indicator has a third color in the view of the game environment at a point in time between the beginning of the turn and the end of the turn.

20. The client computing platform of claim 11, wherein the view module is configured such that responsive to a success of the first user in the game, the path changes color in the view of the game environment to indicate the success of the first user.

* * * * *